United States Patent [19]
Tsunefuji et al.

[11] Patent Number: 5,424,790
[45] Date of Patent: Jun. 13, 1995

[54] PROJECTION APPARATUS

[75] Inventors: Katsuhiko Tsunefuji, Sagamihara; Ayumu Midorikawa, Tokyo, both of Japan

[73] Assignee: Olympus Optical Co., Ltd., Tokyo, Japan

[21] Appl. No.: 88,838

[22] Filed: Jul. 8, 1993

[30] Foreign Application Priority Data

Jul. 20, 1992 [JP] Japan .................... 4-191991
Oct. 19, 1992 [JP] Japan .................... 4-280039

[51] Int. Cl.$^6$ ............... G03B 31/06; G03B 21/43
[52] U.S. Cl. .................... 353/26 A; 353/19; 353/DIG. 2
[58] Field of Search .......... 353/26 A, 26 R, 25, 353/19, 15, 85, DIG. 2, 122; 352/27, 233, 236, 92, 12, 15, 16, 17, 26

[56] References Cited

U.S. PATENT DOCUMENTS

| | | | |
|---|---|---|---|
| 3,276,313 | 10/1966 | Schwartz et al. | 352/26 |
| 3,344,709 | 10/1967 | Taylor | 353/88 |
| 3,697,158 | 10/1972 | Mateja | 352/17 |
| 3,848,978 | 11/1974 | Wray | 352/12 |
| 3,981,570 | 9/1976 | Ashida et al. | 352/12 |
| 4,277,152 | 7/1981 | Taylor | 352/27 |
| 4,791,496 | 12/1988 | Kageyama et al. | 353/19 |
| 4,883,235 | 11/1989 | Niedospial, Jr. | 242/71.1 |

FOREIGN PATENT DOCUMENTS

| | | | |
|---|---|---|---|
| 2735313 | 2/1979 | Germany | 353/19 |
| 54-2115 | 1/1979 | Japan. | |
| 55-126225 | 9/1980 | Japan. | |
| 2-293742 | 12/1990 | Japan. | |

*Primary Examiner*—William A. Cuchlinski, Jr.
*Assistant Examiner*—William C. Dowling
*Attorney, Agent, or Firm*—Frishauf, Holtz, Goodman & Woodward

[57] ABSTRACT

A projection apparatus comprising a holding section for holding a film cassette having an exposed magnetic-zoned film therein, motors for automatically drawing out the leader portion of the film from the film cassette and for forwardly feeding the film with a predetermined timing, a projection lamp and a projection lens pair for illuminating the film to project an image, a magnetic head for detecting magnetic information on the film, a shutter which operates in accordance with the magnetic information detected by the magnetic head, and a control circuit for operating the motors and the shutter in accordance with programs, thereby controlling the film feed timing and shutter operation timing.

28 Claims, 9 Drawing Sheets

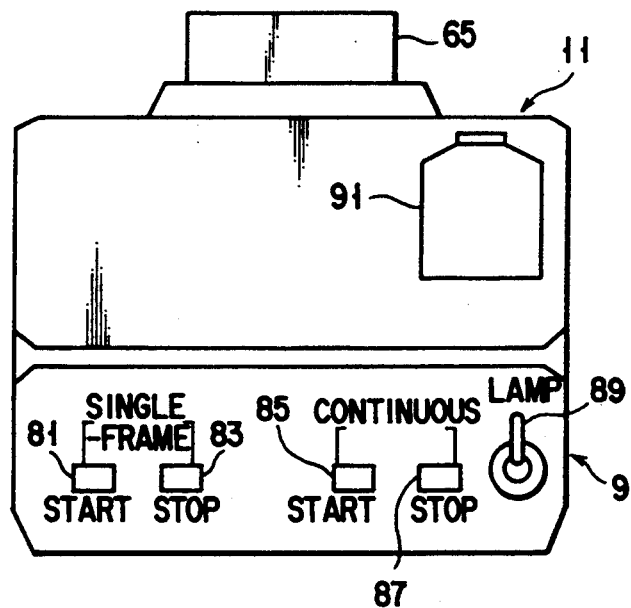
FIG. 3A
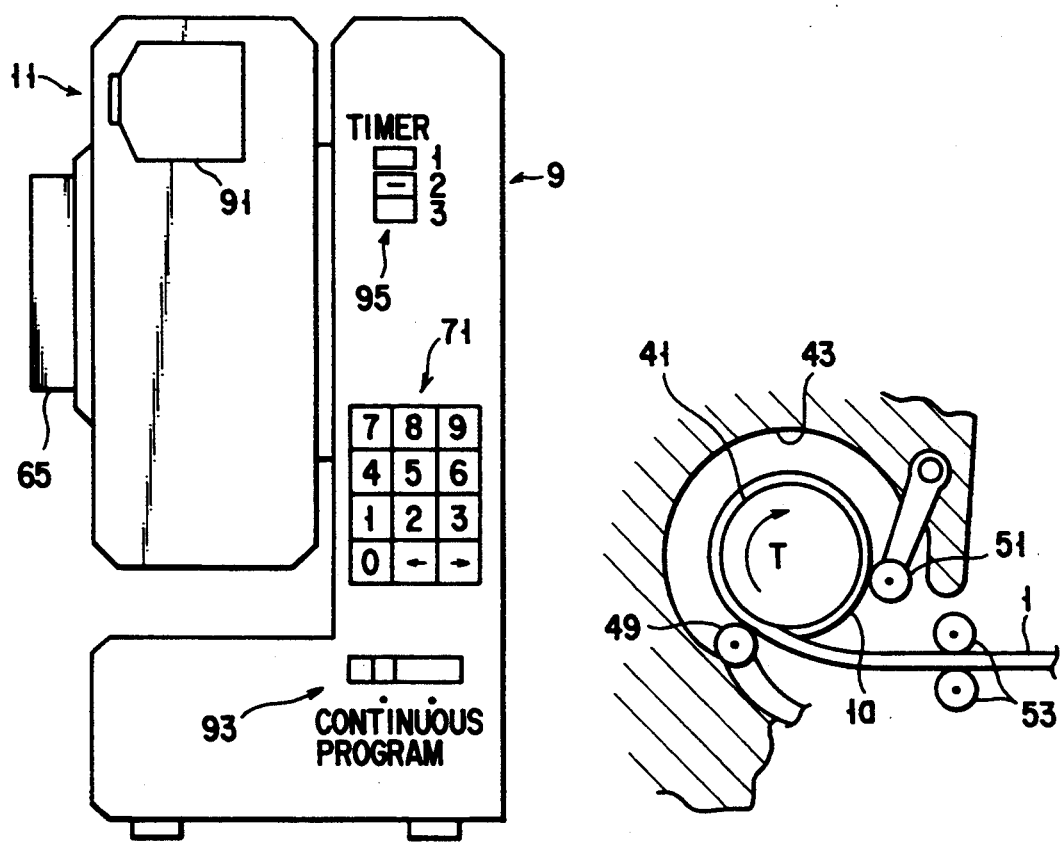
FIG. 3B
FIG. 4

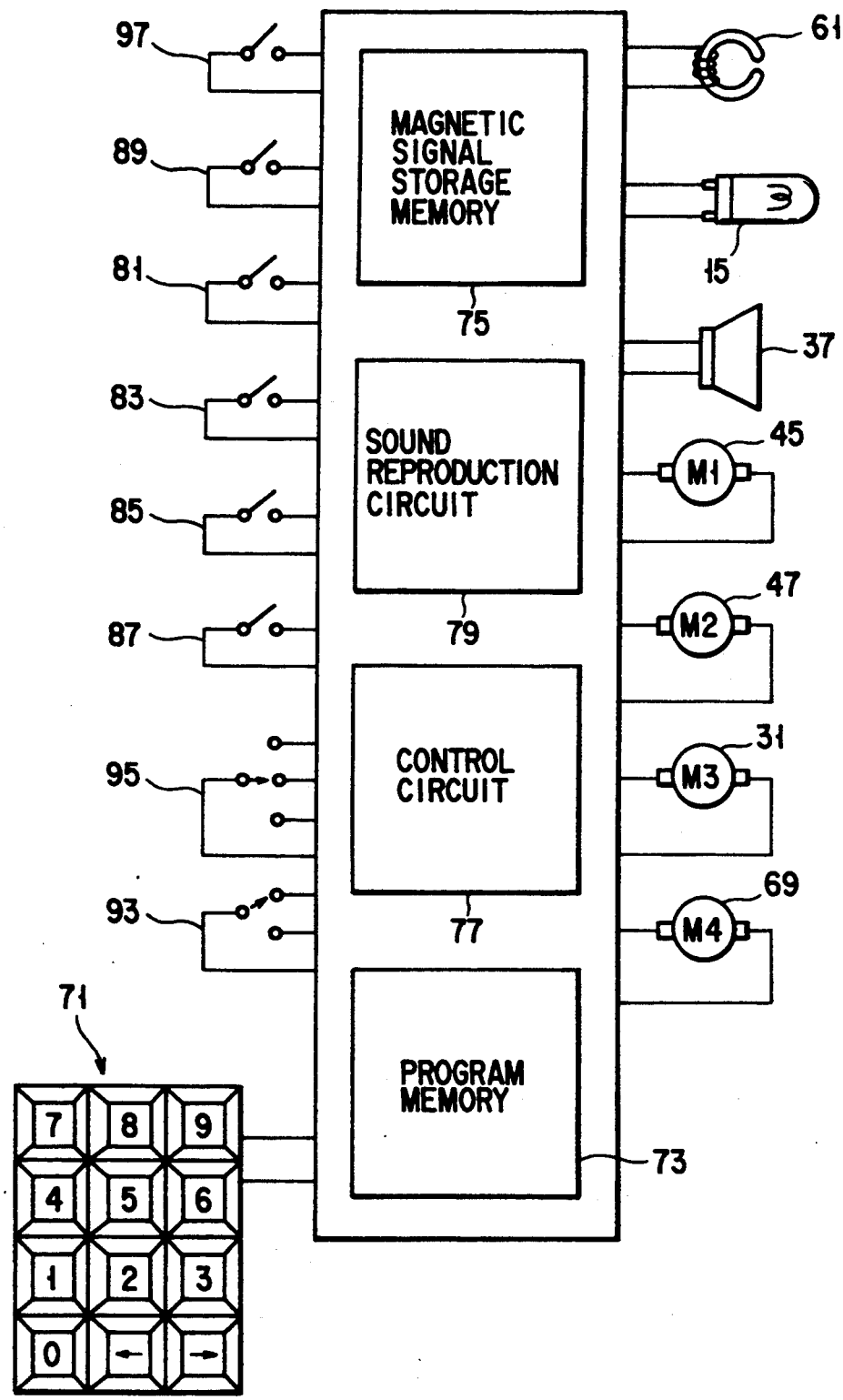
F I G. 6

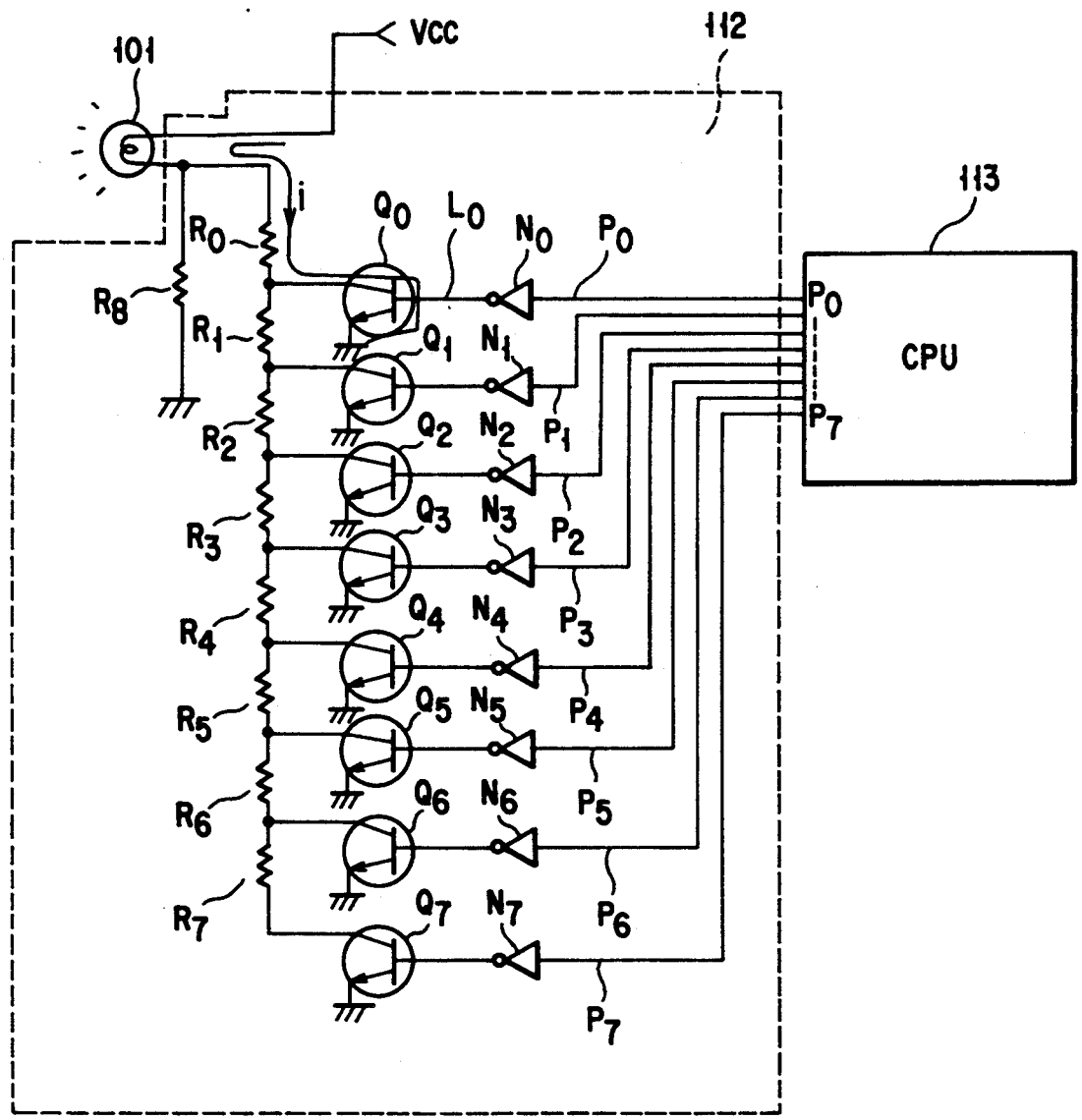
F I G. 10

PROJECTION APPARATUS

BACKGROUND OF THE INVENTION

1. Field of the Invention

The present invention relates to a projection apparatus for projecting an image of a film.

2. Description of the Related Art

Conventionally, a film cassette disclosed in Published Unexamined Japanese Patent Application No. 2-272538 (hereinafter referred to as prior art example 1) and a film cartridge disclosed in Published Unexamined Japanese Patent Application No. 2-293742 (hereinafter referred to as prior art example 2) are known as being applicable to projection apparatuses of this type.

The film cassette of the prior art example 1 is arranged so that a film belt is automatically delivered to the outside of the shell of the cassette by rotating a spool in the film advancing direction.

The film cartridge of prior art example 2 is arranged so that the leading end portion of the film can be fed into a film take-up chamber by rotating a spindle in the film advancing direction.

According to the prior art examples 1 and 2, however, the vertical orientation, for example, of an image formed on the film is not taken into consideration during shooting operation. When projecting the image by applying light to the delivered film, therefore, the image shot inclined or inverted with respect to the vertical direction is inevitably projected without correction on a screen. Accordingly, the apparatus must be moved to be corrected in vertical orientation, or otherwise, must be provided with an additional optical system. Thus, the projection process requires much time and labor, and the cost of the whole apparatus is inevitably high.

For example, techniques disclosed in Published Unexamined Japanese Patent Applications Nos. 54-2115 and 55-126225 may be used as measures for obtaining a vertical orientation confirmation signal for a shooting screen.

Disclosed in Published Unexamined Japanese Patent Application No. 54-2115 is an apparatus with a plurality of light emitting elements which can project vertically or laterally written data on the screen, depending on the attitude of a camera.

Disclosed in Published Unexamined Japanese Patent Application No. 55-126225 is an apparatus in which the camera attitude is detected by means of the action of gravity so that data corresponding to the attitude can be printed in a film.

A novel film has recently been developed in which shooting date information, on-the-spot audio information, etc. can be magnetically recorded. The films of the prior art examples 1 and 2 are designed without giving consideration to the magnetic recording of these data.

Usually, moreover, the films applicable to the conventional projection apparatuses are different in luminance, so that the screen luminance of the projected image varies. If the screen luminance is too low, the image is dark and indistinct. If the luminance is too high, on the other hand, the image taxes an appreciator's eyes. When appreciating a plurality of films loaded in a magazine or the like for hours, in particular, the appreciator's eyes are adversely affected and fatigued by the films.

Practically, it is difficult to adjust the screen luminance of the image with every change of the films in order to eliminate these adverse effects.

SUMMARY OF THE INVENTION

An object of the present invention is to provide a projection apparatus in which a film leader portion is automatically drawn out from a film cassette, which contains an exposed magnetic-zoned film with specified magnetic information recorded therein, so that the film can be fed with a predetermined timing, and in which a magnetic information signal is detected from the film so that a projection image can be controlled in accordance with this magnetic information signal.

According to the invention, when a film cassette containing a magnetic-zoned film is housed in a holding section, a film leader portion is automatically drawn out from the cassette, and is fed forwardly with a predetermined timing. An image formed on the film is projected by operating projection means and shutter means in synchronism with this forward feeding operation. At this time, the projection means is actuated by means of magnetic information detecting means to control the projection image, and the film feed timing and shutter operation timing are controlled by means of programming control means.

Another object of the present invention is to provide a projection apparatus arranged so that the luminance of a screen can be adjusted depending on individual films.

According to the invention, projection light applied to each film is automatically adjusted in accordance with luminance information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A and 3B are a top view and a side view, respectively, of the apparatus shown in FIG. 2;

FIG. 4 is a partial enlarged view showing the way the magnetic-zoned film is taken up in a film take-up chamber of the apparatus shown in FIG. 2;

FIG. 6 is a diagram showing a circuit arrangement of programming control means in the apparatus shown in FIG. 2;

FIG. 10 is a diagram showing a specific example of an arrangement of a lamp luminance modifier shown in FIG. 7;

DETAILED DESCRIPTION OF THE PREFERRED EMBODIMENTS

A projection apparatus according to a first embodiment of the present invention will now be described in detail with reference to the accompanying drawings.

Figure 1:
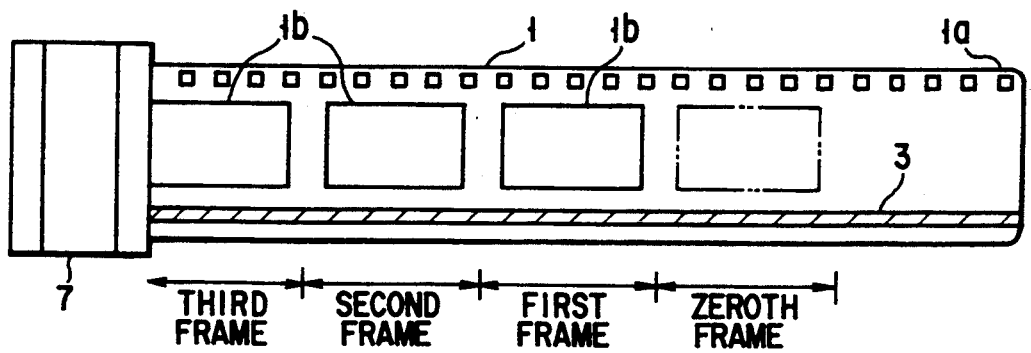
FIG. 1 is a front view showing a state in which part of an exposed magnetic-zoned film is drawn out from a film cassette applicable to a projection apparatus according to a first embodiment of the present invention.

As shown in FIG. 1, a film 1 with an exposed magnetic zone, which is applied to the projection apparatus of the present embodiment, is provided with a magnetic stripe 3 on which magnetic information is recorded in the longitudinal direction of the film along shot frames 1b. Magnetically recorded on the stripe 3 are, for example, frame numbers, date of shooting, vertical orientation information for vertical/lateral shooting, on-the-spot audio information, etc.

The magnetic-zoned film 1 is contained in a film cassette 7, which is designed so that the film 3 can be fed forwardly or reversely as a spindle 5 (see FIG. 2) rotates forwardly or reversely.

FIG. 1 shows a state such that a leader portion 1a of the magnetic-zoned film 1 is drawn out of the film cassette 7. When loading the cassette 7 into the projection apparatus (described in detail later), however, the film leader portion 1a is housed in the cassette 7. Shooting actually starts with a first frame, and a zeroth frame is an imaginary frame used to set an initial position for automatic loading, which will be mentioned later.

Figure 2:
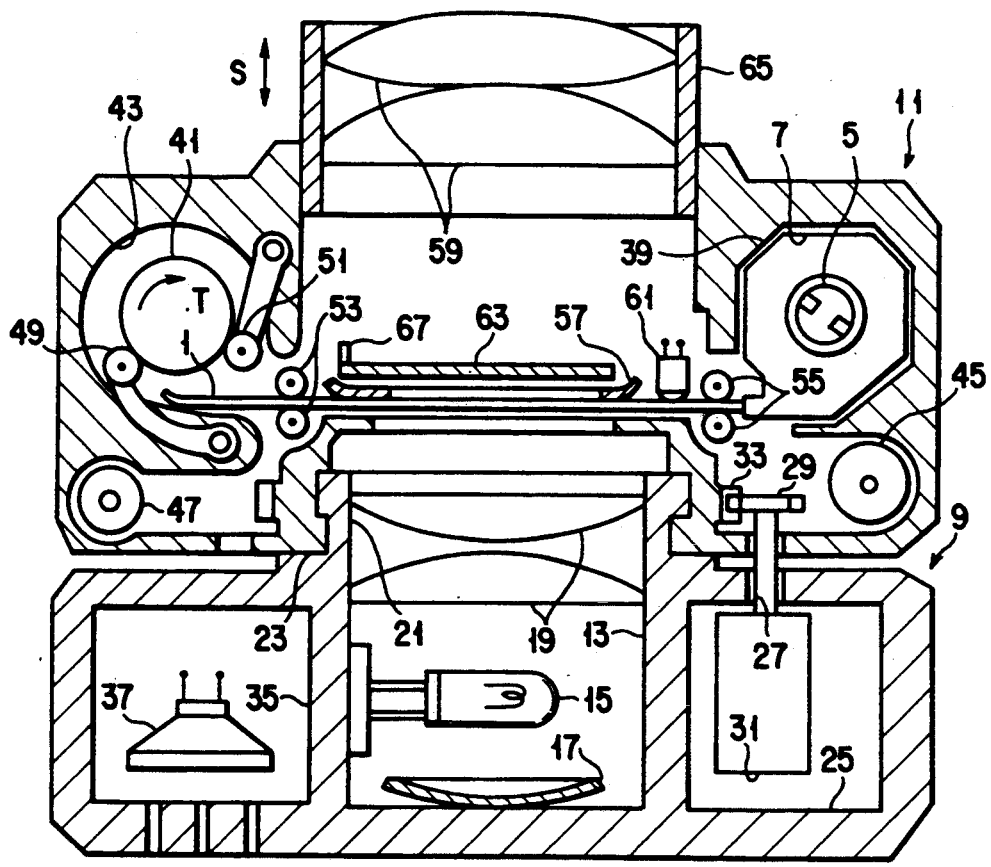
FIG. 2 is a sectional view schematically showing an arrangement of the projection apparatus according to the first embodiment of the invention.

As shown in FIG. 2, the projection apparatus of the present embodiment comprises a projection apparatus body 9 and a film housing 1 rotatably mounted on the body 9.

The projection apparatus body 9 is provided with a projection lamp house 13 substantially in its central portion. The lamp house 13 contains a projection lamp 15, a reflector 17 for reflecting light emitted from the lamp 15, and a condenser lens pair 19 for applying the reflected light from the reflector 17 to the shot frames 1b of the magnetic-zoned film 1.

A first engaging portion 21 protrudes from the projection lamp house 13 so as to extend along the projection axis. A second engaging portion 23 of the film housing 11 is rotatably fitted on the engaging portion 21.

The projection apparatus body 9 is provided with a motor house 25 on the right-hand side thereof as illustrated. The house 25 contains an M3-motor 31 having a rotating shaft 27 and a pinion 29 on the distal end thereof. The pinion 29 is in mesh with a gear 33, which is provided on the outer peripheral surface of the second engaging portion 23. As the motor 31 is driven, a rotatory force applied to the shaft 27 is transmitted through the pinion 29 to the gear 33, so that the film housing 11 rotates in a predetermined direction.

Further, the projection apparatus body 9 is provided with a speaker house 35 on the left-hand side as illustrated. The house 35 contains a speaker 37 which reproduces audio information detected from the magnetic stripe 3 of the magnetic-zoned film 1 by means of a magnetic head 61 (mentioned later).

The film housing 11 comprises a holder section 39, drive means, and a film take-up chamber 43. The section 39 can hold the film cassette 7 which contains the exposed magnetic-zoned film 1 with specific magnetic information recorded thereon. When the cassette 7 is housed in the holder section 39, the drive means automatically draws out the leader portion 1a (see FIG. 1) of the film 1 from the cassette 7, and feeds it with a predetermined timing. The take-up chamber 43 contains a take-up spool 41 which takes up the film 1 from the film cassette 7 in regular sequence.

The drive means includes an M1-motor 45 for reversibly rotating the spindle 5 of the film cassette 7 and an M2-motor 47 for rotating the take-up spool 41.

When the M1-motor 45 is rotated forwardly, the spindle 5 rotates forwardly, thereby delivering the magnetic-zoned film 1 from the film cassette 7. When the motor 45 is rotated reversely, on the other hand, the film 1 is rewound in the cassette 7. When the M2-motor 47 is rotated forwardly, moreover, the take-up spool 41 rotates in the direction of arrow T of FIG. 2, thereby taking up the film 1 in the film take-up chamber 43 in regular sequence.

The film take-up chamber 43 is provided with first and second automatic film take-up rollers 49 and 51, which are continually urged against the outer peripheral surface of the take-up spool 41 by means of springs (not shown).

In this arrangement, as shown in FIG. 4, the leader portion 1a of the magnetic-zoned film 1, guided into the film take-up chamber 43, is first guided along the outer peripheral surface of the take-up spool 41 in a manner such that it is pressed against the spool surface by the first roller 49 as the spool 41 rotates in the forward direction (direction of arrow T of FIG. 2).

Further, the film leader portion 1a guided on the take-up spool 41 is wound on the spool 41 in a manner such that its moving direction is regulated by the second roller 51.

The film housing 11 comprises first and second guide roller pairs 53 and 55, pressure plate 57, projection lens pair 59, magnetic head 61, shutter means, and programming control means. The roller pairs 53 and 55 serve to guide the magnetic-zoned film 1 from the film cassette 7 into the film take-up chamber 43. The pressure plate 57 prevents the film 1, transported forwardly or reversely by means of the roller pairs 53 and 55, from lifting. The lens pair 59 is used to project an image of the film 1, illuminated by the light from the lamp house 13, on a screen (not shown). The magnetic head 61 is used to detect the magnetic information in the magnetic-zoned film 1. The shutter means is released or closed in accordance with the magnetic information detected by means of the head 61. The programming control means activates the drive means and the shutter means in accordance with specific programs, thereby controlling the feed timing for the film 1 and the shutter operation timing.

The projection lens pair 59 is housed and held in a lens tube 65 which is slidable relatively to the film housing 11 in the direction of arrow S in FIG. 2. The focus can be adjusted by sliding the tube 65 in the direction of arrow S.

The pressure plate 57 is formed having an opening in the center through which the light from the lamp house 13 is projected.

The shutter means includes a shutter 63, one end of which is pivotally mounted on a shutter pivot 67, and an M4-motor 69 (see FIG. 6) for driving the shutter 63.

The magnetic head 61 is located between the first and second guide roller pairs 53 and 55 and on the side near the holder section 39 so that it can detect the magnetic information by engaging the magnetic stripe 3 of the magnetic-zoned film 1.

The programming control means, which is constructed in the manner shown in FIG. 6, comprises ten-key input buttons 71, a program memory 73 for storing programs inputted by means of the buttons 71, and a control circuit 77 which drives the drive means, M4-motors 69, etc. in accordance with program signals delivered from the program memory 73 or a magnetic signal storage memory 75, thereby effecting projection control.

A sound reproducing circuit 79 is a circuit for delivering an audio signal, detected from the magnetic stripe 3 of the magnetic-zoned film 1 by means of the magnetic head 61, to the speaker 37. The output state of the circuit 79 is controlled by the control circuit 77.

FIGS. 3A and 3B show an outline of the projection apparatus according to the present embodiment.

Arranged on the top surface of the projection apparatus body 9, as shown in FIG. 3A, are start and stop buttons 81 and 83 for single-frame projection, start and stop buttons 85 and 87 for continuous-frame projection, and an on-off switch 89 for the projection lamp 15. Further, a cassette lid 91 for the holder section 39 (see FIG. 2) of the film housing 11 is liftably mounted on the top surface of the housing 11.

Arranged on a side face of the projection apparatus body 9, as shown in FIG. 3B, are a program input selector switch 93 and a timer switch 95 for changing the projection time for each frame in stages, as well as the aforesaid ten-key input buttons 71.

In the state shown in FIG. 3B, the film housing 11 is situated in a position for vertical-position projection at an angle of about 90° to the position shown in FIG. 3A.

Referring now to FIGS. 2 to 6, the operation of the projection apparatus of the present embodiment will be described.

Figure 5A:
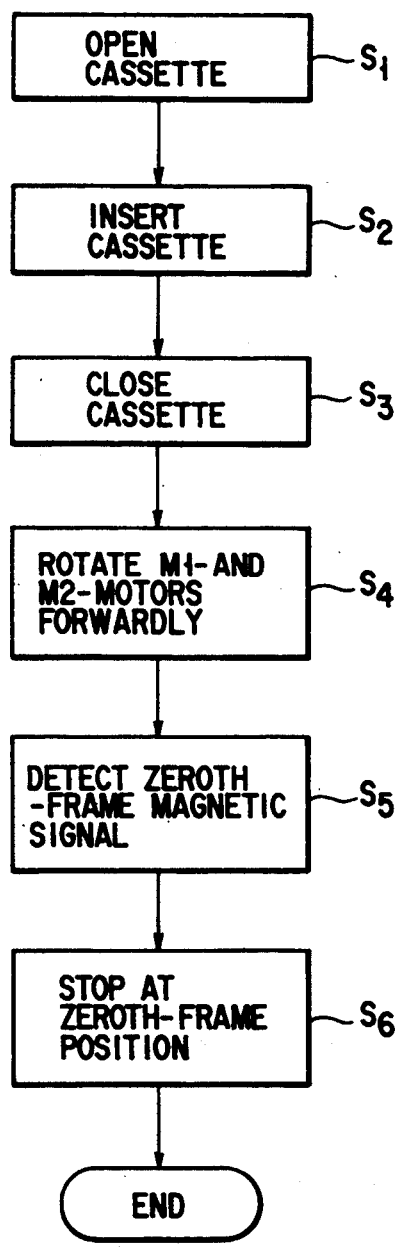
FIG. 5A shows an operational flow for automatic film loading with the film cassette inserted in a holder section.

FIG. 5A shows an operational flow for automatic film loading in which the film cassette 7 is inserted into the holder section 39.

First, the cassette lid 91 is lifted, and the film cassette 7 is inserted into the holder section 39 ($S_1$, $S_2$). When the lid 91 is put on again ($S_3$), thereafter, a cassette lid operation sensor switch 97 (see FIG. 6) is turned on, thereby causing the M1- and M2-motors 45 and 47 to rotate in the forward direction ($S_4$). As the M1-motor 45 rotates forwardly, the spindle 5 also rotates forwardly, thereby delivering the leader portion 1a of the magnetic-zoned film 1 from the film cassette 7.

The magnetic-zoned film 1 is held between the second and first guide roller pairs 55 and 53 as it is guided into the film take-up chamber 43. Thus introduced into the chamber 43, the film 1 is wound on the take-up spool 41 in regular sequence, with its leader portion 1a forward. After this winding, the film can be taken up by means of the M2-motor 47 only.

During this operation, the magnetic head 61 continually searches a position signal recorded on the magnetic stripe 3 (see FIG. 1), thereby detecting the position of the zeroth frame ($S_5$). When the zeroth frame position is detected, the M1- and M2-motors 45 and 47 are stopped by the control circuit 77.

As a result, the feed of the magnetic-zoned film 1 is stopped, and the zeroth frame position is situated on the projection axis ($S_6$), whereupon the automatic film loading is finished.

Figure 5B:
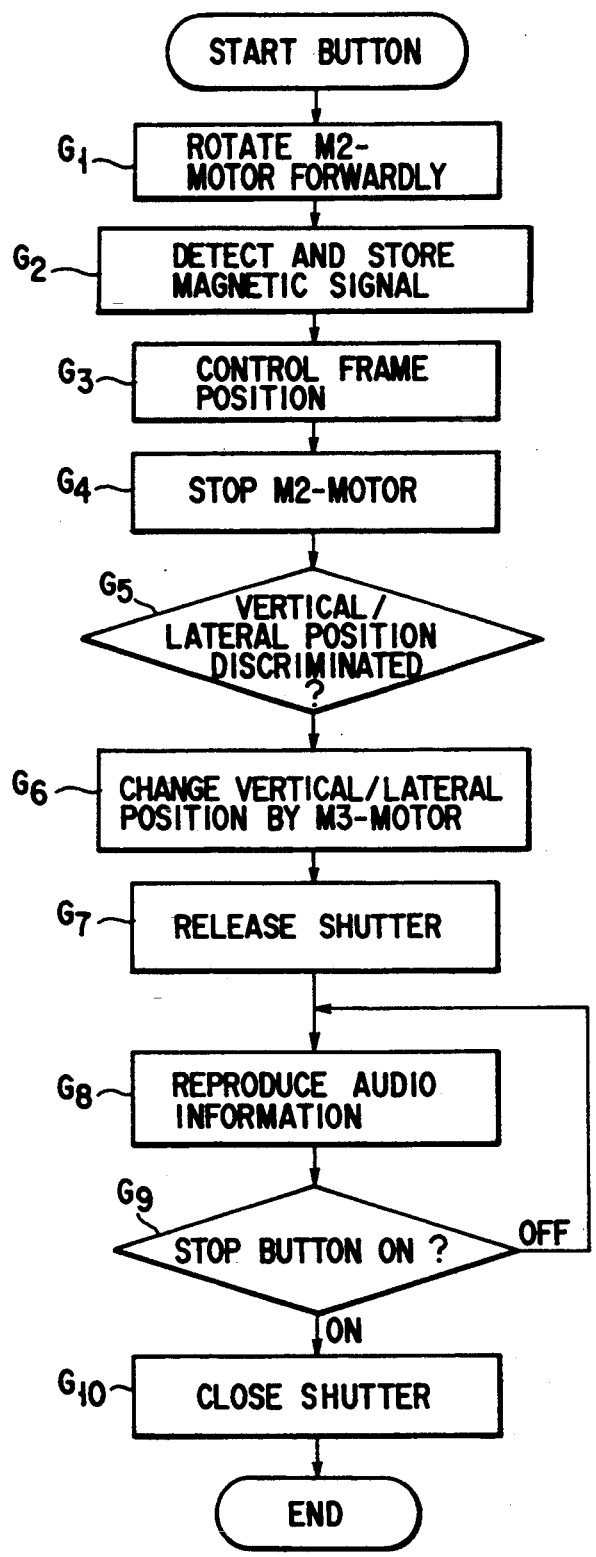
FIG. 5B shows an operational flow for single-frame projection.

FIG. 5B shows an operational flow for single-frame projection.

when the start button 81 for single-frame projection is depressed after the on-off switch 89 is first turned on (see FIGS. 3A and 6), the control circuit 77 causes the M2-motor 47 to rotate in the forward direction in response to a signal generated thereby ($G_1$). As the motor 47 rotates forwardly in this manner, the take-up spool 41 also rotates forwardly, thereby advancing the magnetic-zoned film 1 for one frame.

At this time, the magnetic signals, such as the frame numbers, date of shooting, vertical orientation, audio signal, etc., are detected by means of the magnetic head 61, and are stored in the magnetic signal storage memory 75 ($G_2$).

When the film advancing for one frame is finished, the frame position is controlled by means of the control circuit 77, to which is delivered a signal indicative of the termination of the film advancing, so that the first shot frame 1b is situated on the projection axis ($G_3$), and the M2-motor 47 is stopped ($G_4$). As a result, the first shot frame 1b is situated in a standby position for projection.

At this time, the vertical and lateral positions of the image are discriminated by the control circuit 77 to which the magnetic signals are delivered from the magnetic signal storage memory 75 ($G_5$). Based on the result of this discrimination, the circuit 77 drives the M3-motor 31, as required, to rotate the film housing 11, thereby controlling the vertical orientation of the image ($G_6$).

Thereafter, the shutter 63 is released to project the first frame by the M4-motor 69 which is driven by the control circuit 77 ($G_7$). At the same time, an audio signal, if detected, is reproduced by the sound reproducing circuit 79 (see FIG. 6) and outputted through the speaker 37 ($G_8$).

In terminating the projection, the stop button 83 (see FIGS. 3A and 6) is depressed so that the shutter 63 is closed by the M4-motor 69 which is driven by the control circuit 77 ($G_{10}$).

In starting continuous projection, the on-off switch 89 is first turned on, and the start button 85 for continuous projection is then depressed (see FIGS. 3A and 6). The aforementioned operational flow is repeated thereafter, so that a description of the subsequent procedure will be omitted. The projection time for each frame can be changed in three stages by shifting the timer switch 95 (see FIGS. 3B and 6), and the continuous projection is executed with a timing set by means of a timer.

In starting programmed continuous projection, moreover, the program input selector switch 93 (see FIGS. 3B and 6) is shifted to PROGRAM. Thereafter, the sequence of projection for the shot frame 1b (see FIG.

1) is programmed and entered in the program memory 73 (see FIG. 6) by means of the ten-key input buttons 71 (see FIGS. 3B and 6).

The following is a description of an example of the programmed projection sequence, covering frame numbers 1, 3, 5, 9, 7 and 11 in the order named. Here let it be supposed that the automatic film loading is finished before starting the program input. Also, the timer switch 95 is supposed to have been set in a position which ensures a proper projection time.

When the start button 85 for continuous projection is depressed, the control circuit 77 causes the M2-motor 47 to rotate in the forward direction, thereby starting the advancing of the magnetic-zoned film 1. At this time, the magnetic head 61 monitors the frame numbers recorded on the magnetic stripe 3. When the shot frame 1b with the frame number 1 is detected, a detection signal for this frame is delivered to the control circuit 77.

In response to the input detection signal, the control circuit 77 stops the M2-motor 47, thereby situating the number-1 shot frame 1b on the projection axis. At the same time, the circuit 77 drives the M4-motor 69 to release the shutter 63. As a result, an image formed on the number-1 frame 1b is projected on the screen (not shown).

When the set projection time is over, the control circuit 77 causes the M2-motor 47 again to rotate in the forward direction, so that the magnetic-zoned film 1 starts to be advanced. At this time, the shutter 63 is closed by the circuit 77 lest unnecessary shot frames 1b be projected on the screen.

Similar processing is executed when each of the shot frames with the frame numbers 3 to 9 is detected. According to the programs, the projection sequence is set so that the frame number 7 directly follows the frame number 9. Thus, the film must be reversed.

After the projection of the number-7 shot frame 1b is finished, in this case, the control circuit 77 reversely drives the M1-motor 45 to rotate the spindle 5 in the reverse direction, thereby rewinding the magnetic-zoned film 1.

while the film is being reversed, the magnetic head 61 monitors the frame numbers recorded on the magnetic stripe 3. When the shot frame 1b with the frame number 7 is detected, a detection signal for this frame is delivered to the control circuit 77.

In response to the input detection signal, the control circuit 77 stops the M1-motor 45, thereby situating the number-7 shot frame 1b on the projection axis. At the same time, the circuit 77 drives the M4-motor 69 to release the shutter 63. As a result, an image formed on the number-7 frame 1b is projected on the screen.

After the projection for the frame number 7 is finished, the control circuit 77 then causes the M2-motor 47 to rotate in the forward direction, so that the magnetic-zoned film 1 starts to be advanced, whereupon a detection process for the frame number 11 is entered.

In any of the projection methods described above, the control circuit 77 causes the M1-motor 45 to rotate reversely so that the entire magnetic-zoned film 1 is housed again in the film cassette 7 after the projection is all finished. After the film is housed in this manner, the M1-motor 45 is stopped by the control circuit 77.

The aforementioned programmed continuous projection is executed with the magnetic-zoned film 1 being delivered from the film cassette 7. Alternatively, however, it may be performed as the film 1 is rewound in the cassette 7 after being once taken up by means of the take-up spool 41 (see FIG. 2).

In this case, all the magnetic information recorded on the magnetic stripe 3 is stored in the magnetic signal storage memory 75 (see FIG. 6) by means of the magnetic head 61.

Subsequently, the projection sequence is program memory 73 by means of the ten-key input buttons 71.

By depressing the start button 85 for continuous projection, thereafter, the shot frame 1b to be projected first is detected in accordance with a program menu. More specifically, the desired frame 1b is detected by searching the frames in sequence of frame number, the highest first. The shutter 63 is closed during this detection.

When the desired shot frame 1b thus detected is situated on the projection axis, relevant magnetic information is delivered from the magnetic signal storage memory 75 to the control circuit 77.

Based on the input magnetic information, the control circuit 77 releases the shutter 63, and drives the M3-motor 31 to rotate the lamp housing 11 in a predetermined direction in response to a vertical orientation signal, if any.

As a result, the image formed on the shot frame 1b concerned is projected on the screen. After the projection is finished, the same detection process as aforesaid is executed in accordance with the next program menu, and the projection is effected according to set programs.

Thus, according to the projection apparatus of the present embodiment, the film can be automatically loaded with ease by only putting the film cassette 7, stored with the magnetic-zoned film 1, into the holder section 39 of the apparatus, and any desired shot frame 1b can be projected in a proper projection time. Since the magnetic-zoned film 1 can be preserved in the film cassette 7, moreover, it is easy to handle and requires only a narrow storage space, as compared with the case of the conventional slide mounting system. Since the projected image can be controlled in accordance with magnetic information signals detected from the film 1, furthermore, the vertical orientation of the shot image can be kept fixed during the projection.

A projection apparatus according to a second embodiment of the present invention will now be described with reference to the accompanying drawings.

Figure 7:
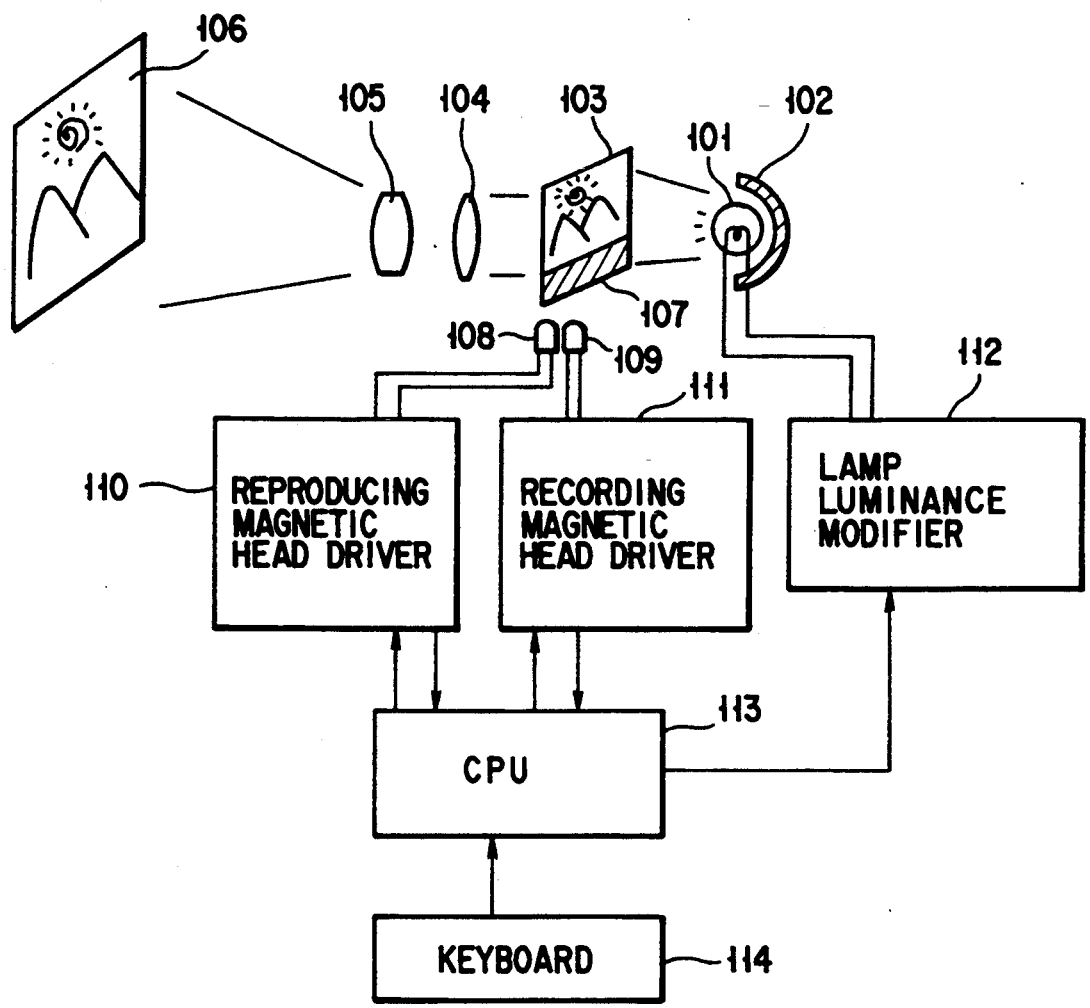
FIG. 7 is a diagram showing a basic arrangement of a projection apparatus according to a second embodiment of the present invention.

FIG. 7 schematically shows a basic arrangement of a slide projection apparatus to which the present embodiment is applied.

In the slide projection apparatus of the present embodiment, as shown in FIG. 7, projection light emitted from a halogen lamp 101 is reflected by a reflecting plate 102, and then applied to a slide film 103.

After an image projected from the slide film 103 is first condensed by means of a condenser lens 104, it is enlarged by means of a projection lens 105 and projected as a reflection on a screen 106.

The slide film 103 is provided with a magnetic recording medium 107, which extends, for example, in a perforation direction, whereby data for the image on the film 103 can be recorded and/or reproduced.

As shown in FIG. 7, moreover, the slide projection apparatus of the present embodiment comprises a recording magnetic head 109, which can record desired data on the magnetic recording medium 107, and a reproducing magnetic head 108 which can reproduce the data on the medium 107.

The reproducing magnetic head 108 can be driven by means of a reproducing magnetic head driver 110, and the recording magnetic head 109 by means of a recording magnetic head driver 111.

The brightness of the halogen lamp 101 can be adjusted by means of a lamp luminance modifier 112.

The reproducing and recording magnetic head drivers 110 and 111 and the lamp luminance modifier 112 can be controlled in timing and the like by means of a central processing unit (CPU) 113. The CPU 113 is connected with a keyboard 114 for external data input.

The following is a description of the operation of the slide projection apparatus according to the present embodiment.

First, a conventional film magazine (not shown), loaded with a number of slide films 103, is rotated so that one of the films 103 is set between the condenser lens 104 and the halogen lamp 101.

Then, the surface of the magnetic recording medium 107 is scanned by means of the reproducing magnetic head 108, whereby previously recorded data is read out. The medium may be scanned either from left to right or from right to left, as in FIG. 7.

The data thus obtained is fetched by the CPU 113 through the reproducing magnetic head driver 110.

The fetched data in the CPU 113 is screen luminance data for the slide film 103. Based on this screen luminance data, the CPU 113 delivers a predetermined control signal to the lamp luminance modifier 112, thereby controlling the drive of the modifier 112.

In response to the input control signal, the lamp luminance modifier 112 controls the amount of radiation from the halogen lamp 101 so that projection light with an optimum luminance is applied to the slide film 103.

The light from the halogen lamp 101, controlled in this manner, is reflected by the reflecting plate 102, and is then evenly applied to the whole frame surface of the slide film 103.

The light transmitted through the slide film 103 is condensed by means of the condenser lens 104, and is then projected on the screen 106 by means of the projection lens 105.

In the embodiment described above, the luminance data for the screen luminance previously recorded on the magnetic recording medium 107 is reproduced, and an image of the slide film 103 is projected on the screen 106. The following is a description of an operation for recording data, including the screen luminance, on the medium 107.

First, the conventional film magazine (not shown), loaded with the numerous slide films 103, is rotated so that one of the films 103 is set between the condenser lens 104 and the halogen lamp 101.

Then, an operator operates the keyboard 114 to enter desired screen luminance data (luminance data) in the CPU 113.

Any other input member may be used in place of the keyboard 14 provided it is capable of external entry of predetermined data.

Based on the input luminance data, the CPU 113 controls the lamp luminance modifier 112, thereby adjusting the luminance of the halogen lamp 101.

Based on the input luminance data, moreover, the CPU 113 delivers a predetermined control signal to the recording magnetic head driver 111. In response to the input control signal, the driver 111 causes the recording magnetic head 109 to scan the magnetic recording medium 107 in a predetermined direction such that predetermined luminance data is recorded on the medium. Thus, the predetermined luminance data is recorded on the recording medium 107.

Figure 8:
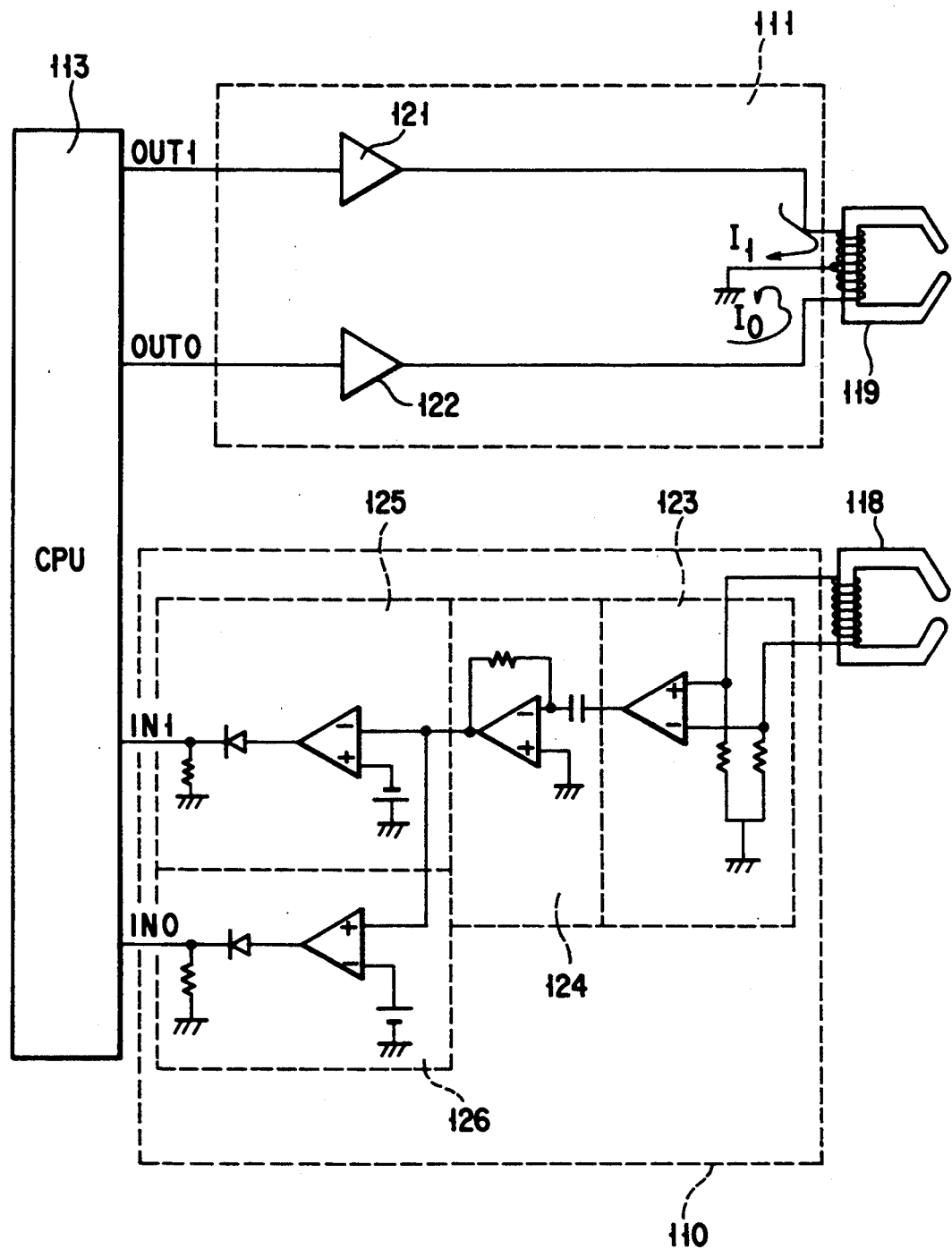
FIG. 8 is a circuit diagram showing a circuit for recording and/or reproducing data (luminance information) from a magnetic recording medium shown in FIG. 7.
Figure 9:
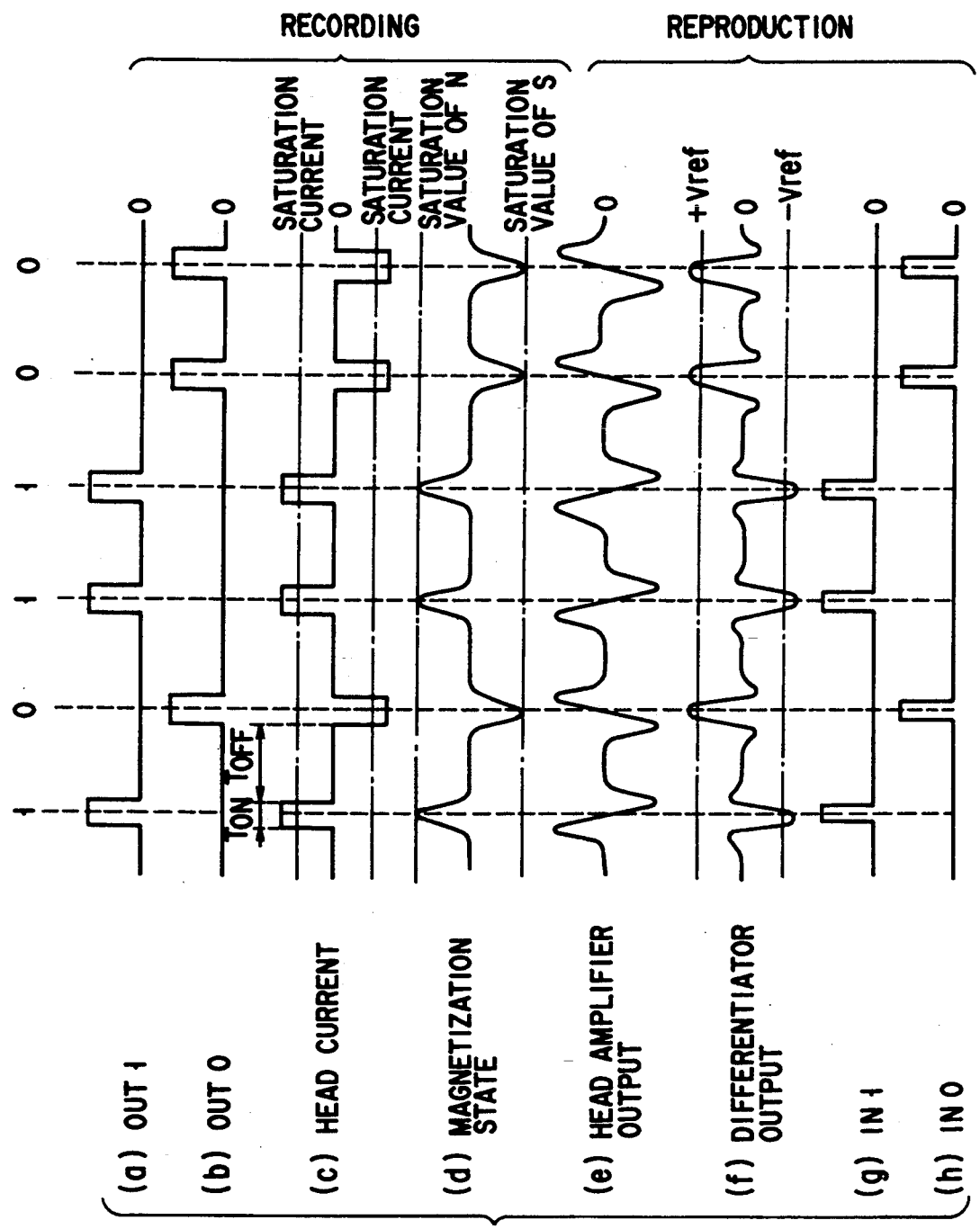
FIG. 9 is a diagram showing waveforms of driving signals for the recording and/or reproducing circuit shown in FIG. 8.

Referring now to FIGS. 8 and 9, a system for the aforesaid recording and/or reproducing operation will be described.

In this recording/reproducing system, the magnetic recording medium 107 may be set in three states, N-direction magnetization, S-direction magnetization, and neutral.

The following is a description of a case of recording "1" on the assumption that the N- and S-direction magnetization states are given by "1" and "0", respectively.

When "H" is delivered to a port OUT1 of the CPU 113, a current $I_1$ flows through a coil of the recording magnetic head 109 via a buffer 121. As this is done, the magnetic recording medium 107 is magnetized in the N-direction. When "H" is delivered to a port OUT0 of the CPU 113, in recording "0", on the other hand, a current $I_0$ flows through a coil of the magnetic head 109 via a buffer 122, and the medium 107 is magnetized in the S-direction.

An advantage of this recording system is that the presence of neutral regions between bits makes the boundaries of bit data clear, thereby obviating the necessity of synchronizing clocks.

In the reproduction mode, on the other hand, the magnetic recording medium 107 is moved in a manner such that its magnetized portion is in contact with the reproducing magnetic head 108. Thereupon, a magnetic field passing through the head 108 changes, so that a voltage is produced. This voltage is amplified by means of an amplifier 123 (see (e) in FIG. 9), differentiated by means of a differentiator 124 (see (f) in FIG. 9), and then applied to comparators 125 and 126.

If the recorded data is "1", the differentiator output (see (f) in FIG. 9) reaches a negative peak, so that the output of the comparator 125 is inverted. As a result, an "H" signal is applied to a port IN1 of the CPU 113. If the recorded data is "0", in contrast with this, the differentiator output takes a positive peak, so that the output of the comparator 126 is inverted. As a result, the "H" signal is applied to a port IN0 of the CPU 113.

FIG. 10 shows a specific arrangement of a lamp luminance modifier 112 (see FIG. 7).

The lamp luminance modifier 112 can vary the luminance of the halogen lamp 101 in eight stages by electrically selecting eight lines which are connected to the CPU 113.

As shown in FIG. 10, NAND circuits $N_0$ to $N_7$ of transistor-transistor logics are connected, respectively, to eight lines $P_0$ to $P_7$ which extend from the CPU 113. The circuits $N_0$ to $N_7$ are connected to the halogen lamp 101 through their corresponding transistors $Q_0$ to $Q_7$ and resistors $R_0$ to $R_7$.

The following is a description of the flow of a current i.

A line $V_{CC}$ of the halogen lamp 101 is connected electrically to a positive electrode (+) of a power source (not shown).

When none of the transistors $Q_0$ to $Q_7$ are on, current supplied from the power source flows through the halogen lamp 101 and a resistor $R_8$ to the ground.

When only the transistor $Q_0$ is turned on with the transistors $Q_1$ to $Q_7$ off, the current from the power source passes through the halogen lamp 101. Thereafter, part of the current drops to the ground via the resistor $R_8$, while the remaining part flows to the ground through the resistor $R_0$ and the collector of the transistor $Q_0$, and then through the base and emitter of the transistor $Q_0$. Thus, the current i flows in the manner shown in FIG. 10.

More specifically, the "H" signal must be applied as an input to the transistor $Q_0$ in order to actuate it. In an initial stage, however, all the lines $P_0$ to $P_7$ of the CPU 113 are kept in an "H" signal output state. Accordingly, the CPU 113 shifts only the line $P_0$ from the "H" to an "L" signal output state. As a result, the "H" signal is delivered to the line $L_0$ through the NAND circuit $N_0$, so that the "H" signal can be applied to the transistor $Q_0$. During this operation, the other lines $P_1$ to $P_7$ are in the "H" signal output state. Thus, the current line i is established, as mentioned before.

In the case where only the transistor $Q_7$ is turned on with the transistors $Q_0$ to $Q_6$ off, the current supplied from the power source passes through the halogen lamp 101, flows into the transistor $Q_7$ through all the resistor $R_0$ to $R_7$, and then drops to the ground.

Although the respective values of the resistors $R_0$ to $R_7$ can be individually freely set, eight regular gradations of brightness can be obtained by setting all these values at the same values. The current which flows when the halogen lamp 101 starts to glow is several times as high as the rated current of the lamp. The use of the resistor $R_8$, however, allows an optimum current to flow through the circuit, so that the circuit can be prevented from being damaged by overcurrent.

Actually, a current which is low enough not to cause the halogen lamp 101 to glow is supplied. By doing this, the starting current for the change of the luminance is reduced to prevent overloading on each transistor. Thus, in changing the luminance of the lamp 101, the CPU 113 turns on only one of the transistors $Q_0$ to $Q_7$ with all the others off.

Since the brightness of the halogen lamp 101 depends on the level of the current flowing through the lamp 101, it is higher when only the transistor $Q_0$ is turned on than when only the transistor $Q_1$ is turned on.

The brightness of the lamp 101 is highest when only the transistor $Q_0$ is turned on, and gradually becomes lower as the energized transistor shifts from $Q_1$ to $Q_7$. In total, eight gradations of brightness can be created.

In the embodiment described above, the circuit combining the resistors and transistors is used as means for changing the brightness of the halogen lamp 101. Alternatively, however, the resistance value may be changed directly by means of the CPU 113. Thus, any desired arrangement is applicable provided it can control the current to be supplied to the lamp 101.

Referring now to the flow chart of FIG. 11, the operation for recording the aforesaid data (luminance data) will be described.

After the slide film 103 (see FIG. 7) is first set, entry of any of luminance data "0" to "7" by means of the keyboard 114 (see FIG. 7) is awaited (Step S1).

Figure 11:
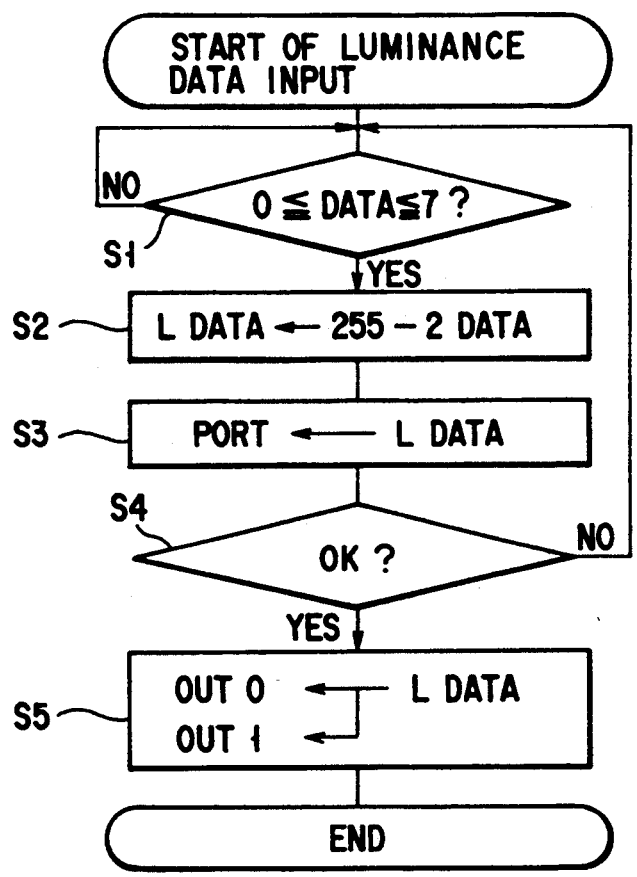
FIG. 11 shows a flow chart for illustrating a write operation for the data (luminance information)

The eight luminance data, each having any of the values "0" to "7", are delivered into the circuit through the eight lines $P_0$ to $P_7$ of the CPU 113 shown in FIG. 11.

When the data "0" is inputted by means of the keyboard 114, for example, the lamp luminance modifier 112 performs predetermined data conversion so that projection light of an luminance corresponding to the data "0" is emitted from the halogen lamp 101 (Step S2).

At this time, the CPU 113 turns on only the port $P_0$ with all the other ports off.

When the input data is "3", only the port $P_3$ is turned on.

The following is a description of the data conversion executed in Step S2.

when the data inputted by means of the keyboard 114 is "0", the transistor $Q_0$ is turned on by energizing the port $P_0$ only. In this case, bit data for the ports $P_7$ to $P_0$ are given by "11111110".

Actually, the data inputted by means of the keyboard 114 is expressed by hexadecimal notation, and this hexadecimal data is handled as one byte. If the converted data is given by one byte, therefore, the bit data for the ports $P_7$ to $P_0$ can be expressed by "FE". These bit data are stored in a code address Ldata.

Likewise, if the input data is "3", the bit data for the ports $P_7$ to $P_0$ are given by "11110111", and "Ldata←F7" is stored.

In lighting the halogen lamp 101 on the basis of the contents of the loaded code address Ldata, thereafter, the values in the address Ldata are delivered to the ports $P_7$ to $P_0$ (Step S3).

The most significant bit (MSB) in the code address Ldata corresponds to the port $P_7$, and the least significant bit (LSB) to the port $P_0$.

Thereafter, it is determined whether the luminance of the image projected on the screen 106 by means of the projection light emitted from the lit halogen lamp 101 is proper or not (Step S4).

If this luminance is not proper (NO), the program returns to Step S1, whereupon the luminance is modified again into a proper one. If "OK" is obtained (YES), the values in the code address Ldata are recorded on the magnetic recording medium 107 of the slide film 103 (Step S5).

In Step S5, an operation for recording "1" and "0" for the data shown in FIG. 9 is performed. Thus, the bit data for the bits from the MSB to the LSB in the code address Ldata are successively recorded on the magnetic recording medium 107.

More specifically, data $FE_H$ ($11111110_B$) is recorded by combining $T_{ON}$ and $T_{OFF}$ shown at (c) in FIG. 9 while causing the recording magnetic head 109 to scan by means of the recording magnetic head driver 111 (see FIG. 7). Thus, in the case where the MSB is "1", the port OUT1 (see (a) in FIG. 9) is switched to "H", and at the same time, the port OUT0 (see (b) in FIG. 9) to "L". This signal output operation is consecutively repeated seven times till the bit which directly precedes the LSB. As the LSB becomes "0", the ports OUT1 and OUT0 are switched to "L" and "H", respectively, whereupon the recording is completed.

As a result of this series of operations, the luminance data is recorded on the magnetic recording medium 107 of the slide film 103.

In the system for recording the luminance data on a number of slide films 103 contained in the film magazine (not shown), the film 103 is replaced with the next one after the process of Step S5 is finished, and the program returns to Step S1, whereupon data is recorded according to the same operational flow as aforesaid. Data recording on a plurality of slide films 103 is accomplished by repeating this flow operation.

Figure 12:
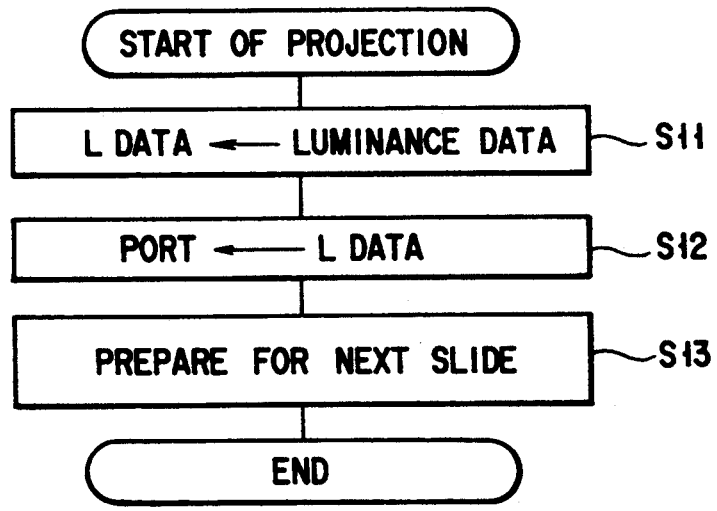
FIG. 12 shows a flow chart for illustrating an operation for reading and projecting the data (luminance information) from the magnetic recording medium.

Referring now to the flow chart of FIG. 12, a series of operations for projecting the image on the screen 106 in accordance with the read luminance data will be described.

After one of the slide films 103 is first set in position, the reproducing magnetic head driver 110 is actuated, and the luminance data recorded on the magnetic recording medium 107 is written in the code address Ldata by means of the reproducing magnetic head 108 (Step S11).

In reading the data bit by bit, the reproducing magnetic head 108 is caused to scan from the same position for the start of the data recording.

In doing this, the data bits are successively read out one after another, starting with the value of the MSB for recording. Thus, the first and last data stored in the code address Ldata are the MSB and LSB, respectively.

Then, the MSB and LSB in the code address Ldata are delivered to the ports $P_7$ and $P_0$, respectively, of the CPU 113 shown in FIG. 10 (Step S12).

As a result, the image to which the projection light having an optimum luminance is applied is projected on the screen 106 in accordance with the data in the magnetic recording medium 107 of the slide film 103.

Subsequently, the film magazine is shifted to proceed to the next stage of slide projection in response to an automatic change synchronizing signal or the like delivered from an external cassette recorder (not shown) (Step S13).

In continuously appreciating the slide films, therefore, the process of Step S11 and the subsequent processes of operation are repeatedly executed.

In the slide projection apparatus according to the present embodiment, as described herein, the projection light is automatically adjusted for the image on each slide film in accordance with the recorded luminance data, so that each image can be projected with an optimum luminance on the screen when continuously appreciating the slide with use of the film magazine and the like, moreover, clear-picture projection can be easily effected so that prolonged appreciation can be enjoyed without fatigue.

It is to be understood that the present invention is not limited to the embodiments described above, and that various changes and modifications may be effected therein by one skilled in the art without departing from the scope or spirit of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A projection apparatus comprising:
an exposed and developed roll-shaped film having a recording section with at least shooting attitude information recorded therein; and
projecting means for projecting an image of the film, the projecting means including a magazine for holding and transporting the film, a drive mechanism for rotating the magazine around a projection axis, and a control mechanism for controlling the drive mechanism to define a rotational position of the magazine in accordance with the shooting attitude information recorded in the recording section.

2. A projection apparatus according to claim 1, wherein said shooting attitude information includes information indicative of a vertical orientation of the film.

3. A projection apparatus according to claim 1, wherein said recording section has an index indicating at least an order of photographing recorded therein.

4. A projection apparatus for projecting an image of an exposed and developed roll-shaped film having a recording section with shooting attitude information recorded therein, comprising:
a holding section for holding the film;
a take-up section for taking up the film;
transportation means for transporting the film held in the holding section to the take-up section;
a projection optical system for projecting a single-frame image of the film; and
drive means for rotating the holding section, take-up section, and transportation means relatively to the projection optical system in accordance with the shooting attitude information recorded in the recording section.

5. A projection apparatus according to claim 4, wherein said recording section has an index indicating at least an order of photographing recorded therein.

6. A projection apparatus for projecting an image of an exposed and developed roll-shaped film contained in a film cassette, and the film having a magnetic recording section in which magnetic recording information including an index indicating at least an order of photographing has been recorded, comprising:
a holding chamber for holding the film cassette;
delivery means for delivering the film from the film cassette;
take-up means for taking up the film in the film cassette;
detecting means for detecting the magnetic recording information recorded in the magnetic recording section;
storage means for storing programming information; and
control means for controlling a drive of the delivery means and of the take-up means in accordance with the magnetic recording information detected by the detecting means and the programming information stored in the storage means.

7. A projection apparatus for projecting an image of an exposed and developed roll-shaped film contained in a film cassette, and the film having a magnetic recording section in which magnetic recording information including an index indicating at least an order of photographing has been recorded, comprising:
a holding chamber for holding the film cassette;
delivery means for delivering the film from the film cassette;
take-up means for taking up the film in the film cassette;
detecting means for detecting the magnetic recording information recorded in the magnetic recording section;
storage means for storing programming information;
control means for controlling a drive of the delivery means and of the take-up means on the basis of programming information stored in the storage means and the magnetic recording information detected by the detecting means; and
reproducing means for reproducing the detected magnetic recording information during projection.

8. A projection apparatus for projecting an image of an exposed and developed roll-shaped film contained in a film cassette, and the film having a magnetic recording section in which magnetic recording information including an index indicating at least an order of photographing has been recorded, comprising:
- operating information input means;
- reading means for reading the magnetic recording information recorded in the magnetic recording section;
- a holding chamber for holding the film cassette;
- delivery means for delivering the film from the film cassette;
- take-up means for taking up the film in the film cassette; and
- control means for controlling a drive of the delivery means and of the take-up means in accordance with operating information inputted by the operating information input means and the magnetic recording information read by the reading means.

9. A projection apparatus for projecting an image of an exposed and developed roll-shaped film contained in a film cassette, and the film having a magnetic recording section with magnetic recording information recorded therein, comprising:
- control means for projection sequence control;
- data input means for entering predetermined data in the control means;
- feeding means for feeding the film contained in the film cassette;
- reproducing means for reproducing the magnetic recording information recorded in the magnetic recording section;
- a projection optical system for projecting a single-frame image of the film;
- shutter means for controlling a projection timing of the projection optical system; and
- image position setting means for rotating the projected image in a predetermined direction around a optical axis of the projection optical system.

10. A projection apparatus according to claim 9, wherein said magnetic recording information recorded in the magnetic recording section of the film includes an index indicating at least an order of photographing.

11. A projection apparatus according to claim 9, wherein said image position setting means controls the position of the projected image in accordance with the output of the control means which responds to the output of the reproducing means.

12. A projection apparatus according to claim 9, further comprising sound reproducing means for storing, reproducing, and acoustically outputting an audio signal recorded in the magnetic recording section of the film.

13. A controller for a projection apparatus for projecting an image of an exposed and developed roll-shaped film having a magnetic recording section with magnetic recording information recorded therein, comprising:
- setting means for setting a projection sequence of the projection apparatus;
- storage means for storing the projection sequence set by means of the setting means;
- reproducing means for reproducing the magnetic recording information recorded in the magnetic recording section; and
- control means for controlling the projection apparatus in accordance with the projection sequence stored in the storage means.

14. A controller according to claim 13, wherein said magnetic recording information recorded in the magnetic recording section of the film includes an index indicating at least an order of photographing.

15. A projection apparatus for projecting an image of a film having a magnetic recording section with magnetic recording information recorded therein, comprising:
- a projection light source for applying projection light to the film;
- luminance modifying means for changing the projection luminance of the projection light emitted from the projection light source;
- reading means for reading the magnetic recording information recorded in the magnetic recording section; and
- control means for controlling the luminance modifying means in accordance with the magnetic recording information read by the reading means.

16. A projection apparatus according to claim 15, wherein said magnetic recording information recorded in the magnetic recording section of the film includes an index indicating at least an order of photographing.

17. A projection apparatus according to claim 15, further comprising means for writing projection luminance data in the magnetic recording section of the film.

18. A projection apparatus for projecting an image of a film having a magnetic recording section with magnetic recording information recorded therein, comprising:
- a light source for illuminating a single-frame image of the film;
- reproducing means for reproducing the magnetic recording information recorded in the magnetic recording section;
- computing means for computing control data for controlling a projection luminance of the light source, in accordance with a signal delivered from the reproducing means;
- control means for driving the light source to change the projection luminance in accordance with the control data;
- resetting means capable of optionally resetting the projection luminance; and
- reloading means for reloading the magnetic recording luminance in the magnetic recording section of the film in accordance with the projection luminance reset by the resetting means.

19. A projection apparatus according to claim 18, wherein said magnetic recording information recorded in the magnetic recording section of the film includes an index indicating at least an order of photographing.

20. A slide projection apparatus for projecting an image of a film having a magnetic recording section in which magnetic recording information is recordable, comprising:
- a halogen lamp for applying light to one frame of the film and projecting an image, formed on the frame, on a screen;
- projection luminance adjusting means for adjusting a luminance of the projection image projected on the screen;
- reproducing means for reading the magnetic recording information stored in the magnetic recording section; and
- projection luminance control means for controlling the projection luminance adjusting means to adjust the luminance in accordance with the magnetic recording information read by the reproducing means.

21. A slide projection apparatus according to claim 20, wherein said magnetic recording section of the film has at least magnetic recording information including an index indicating at least an order of photographing recorded therein.

22. A slide projection apparatus according to claim 20, wherein said projection luminance adjusting means is controlled by means of a digital signal.

23. A slide projection apparatus according to claim 20, wherein said projection luminance adjusting means includes control means for controlling the level of a current flowing through the halogen lamp.

24. A slide projection apparatus according to claim 20, wherein said projection luminance control means includes means for controlling the projection luminance adjusting means in accordance with exposure information for the film recorded in the magnetic recording section of the film.

25. A slide projection apparatus according to claim 20, wherein said projection luminance control means includes conversion means for converting data computed by means of the projection luminance adjusting means into a signal capable of being recorded in the magnetic recording section of the film.

26. A slide projection apparatus according to claim 20, further comprising a control mechanism disposed outside the slide projection apparatus for externally controlling the projection luminance control means.

27. A slide projection apparatus according to claim 26, wherein said control mechanism controls at least the projection luminance adjusting means in accordance with a program signal applied thereto.

28. A slide projection apparatus according to claim 26, wherein said control mechanism controls at least the projection luminance control means in accordance with a program signal applied thereto.

* * * * *